United States Patent
Kato

(10) Patent No.: US 11,866,583 B2
(45) Date of Patent: Jan. 9, 2024

(54) ADDITION-CURABLE LIQUID SILICONE RUBBER COMPOSITION AND MOLDED SILICONE-RUBBER OBJECT

(71) Applicant: SHIN-ETSU CHEMICAL CO., LTD., Tokyo (JP)

(72) Inventor: Nobu Kato, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 660 days.

(21) Appl. No.: 17/053,884

(22) PCT Filed: Apr. 8, 2019

(86) PCT No.: PCT/JP2019/015238
§ 371 (c)(1),
(2) Date: Nov. 9, 2020

(87) PCT Pub. No.: WO2019/225178
PCT Pub. Date: Nov. 28, 2019

(65) Prior Publication Data
US 2021/0292556 A1 Sep. 23, 2021

(30) Foreign Application Priority Data
May 24, 2018 (JP) .................................. 2018-099376

(51) Int. Cl.
*C08L 83/04* (2006.01)

(52) U.S. Cl.
CPC ......... *C08L 83/04* (2013.01); *C08L 2205/025* (2013.01); *C08L 2205/035* (2013.01)

(58) Field of Classification Search
CPC ...................................................... C08L 83/04
USPC .......................................... 523/100; 524/100
See application file for complete search history.

(56) References Cited

U.S. PATENT DOCUMENTS

2002/0111452 A1   8/2002  Ikeno et al.
2017/0081515 A1*  3/2017  Kato ........................ C08K 3/36

FOREIGN PATENT DOCUMENTS

| | | |
|---|---|---|
| EP | 1361253 A1 | 11/2003 |
| EP | 3473676 A1 | 4/2019 |
| JP | 2002-179921 A | 6/2002 |
| JP | 2003-321609 A | 11/2003 |
| JP | 2007-103494 A | 4/2007 |
| JP | 2011-46826 A | 3/2011 |
| JP | 2013-64089 A | 4/2013 |
| JP | 2013-64090 A | 4/2013 |
| JP | 2017-222814 A | 12/2017 |
| JP | 2018-76407 A | 5/2018 |
| WO | WO 2015/178140 A1 | 11/2015 |
| WO | WO-2015178140 A1 * | 11/2015 ............... C08K 3/36 |

OTHER PUBLICATIONS

International Search Report, issued in PCT/JP2019/015238, PCT/ISA/210, dated Jul. 2, 2019.
Written Opinion of the International Searching Authority, issued in PCT/JP2019/015238, PCT/ISA/237, dated Jul. 2, 2019.

* cited by examiner

*Primary Examiner* — Deve V Hall
(74) *Attorney, Agent, or Firm* — Birch, Stewart, Kolasch & Birch, LLP

(57) ABSTRACT

An addition-curable liquid silicone rubber composition and a molded silicone-rubber object are provided.
The addition-curable liquid silicone rubber composition comprises
(A) an alkenylated linear organopolysiloxane which has one silicon-atom-bonded alkenyl group only at each of both molecular-chain terminals and which has an average degree of polymerization of 1,500 or lower and is liquid at 25° C.,
(B) an alkenylated linear organopolysiloxane which has two or three silicon-atom-bonded alkenyl groups at each of both molecular-chain terminals and which has an average degree of polymerization of 1,500 or lower and is liquid at 25° C.,
(C) organohydrogenpolysiloxanes comprising
(C-1) an organohydrogenpolysiloxane having at least three silicon-atom-bonded hydrogen atoms and
(C-2) a linear organohydrogenpolysiloxane blocked with a diorganohydrogensiloxy group at each of both molecular-chain terminals,
(D) reinforcing silica obtained by hydrophobizing fumed silica having a BET specific surface area of 130 m²/g or larger, and
(E) an addition-reaction catalyst.

7 Claims, No Drawings

ADDITION-CURABLE LIQUID SILICONE RUBBER COMPOSITION AND MOLDED SILICONE-RUBBER OBJECT

TECHNICAL FIELD

This invention relates to an addition-curable liquid silicone rubber composition and a molded silicone rubber article.

BACKGROUND ART

Because of heat resistance, freeze resistance, safety, appearance (transparency), touch, and durability, silicone rubber is widely used as a material for molding infant toys, dishes, toothbrushes, bottle nipples, and baby pacifiers. In particular, silicone rubber compositions of addition reaction cure type are favorably used in these applications in view of safety, that is, because they do not form by-products in contrast with silicone rubber compositions of organic peroxide cure type wherein by-products result from decomposition of organic peroxides.

While silicone rubber articles which are currently in widespread use have a hardness of 30 to 70 on Durometer type A scale, articles having a lower hardness are desired in order to enable the diversification of design and application. Nevertheless, in an attempt to reduce the amount of reinforcing silica in order to formulate a low hardness silicone rubber, the resulting rubber loses strength so that a molded rubber may be cracked upon removal from the mold after molding, or the rubber may be readily broken during service. In another attempt to tailor the balance of addition crosslinking in order to formulate a low hardness silicone rubber without reducing reinforcing silica, the resulting rubber becomes inelastic or sticky on the surface. Bottle nipples and masks made of such rubber give a discomfort touch.

To solve the outstanding problems, Patent Document 1 (JP-A 2003-321609) proposes a method of adding silicone gum and silicone fluid free of addition reactive group to a liquid silicone rubber composition for reducing the hardness of silicone rubber while maintaining high tear strength. However, when the hardness of rubber is reduced by the method of Patent Document 1, there arises a problem that on use as food containers, the silicone fluid free of addition reactive group migrates to an oily food. It is also reported in Patent Document 2 (JP-A 2002-179921) and Patent Document 3 (JP-A 2017-222814) that a rubber having a low hardness and yet a high tear strength is obtained when a linear organopolysiloxane containing silicon-bonded hydrogen atoms at both ends and an organohydrogenpolysiloxane having at least three silicon-bonded hydrogen atoms per molecule are used as a crosslinker having a chain-extending effect. This method, however, entails the problem that the rubber as cured contains an incompletely crosslinked silicone component resulting from chain extension and when the rubber is in contact with an oily food, the incompletely crosslinked silicone component migrates to the food. The Food and Drug Administration Department (FDA) sets forth in the regulations of 21CFR177.2600 (Rubber Articles Intended for Repeated Use) that rubber articles in contact with fatty foods shall meet the specified amount of extractives with n-hexane. In the extraction test according to the FDA regulations, some rubber articles manufactured by the above method yield extractives in excess of the specified amount. It is further reported in Patent Document 4 (JP-A 2007-103494) that a low hardness rubber is obtainable when an organopolysiloxane containing two alkenyl groups per molecule and an organopolysiloxane containing at least three alkenyl groups per molecule are vulcanized with an organohydrogenpolysiloxane containing two silicon-bonded hydrogen atoms per molecule. In this case, however, the molded article is very sticky on its surface, undesirably causing a discomfort feel on use in direct contact with the skin.

PRIOR ART DOCUMENTS

Patent Documents

Patent Document 1: JP-A 2003-321609
Patent Document 2: JP-A 2002-179921
Patent Document 3: JP-A 2017-222814
Patent Document 4: JP-A 2007-103494

SUMMARY OF INVENTION

Technical Problem

An object of the invention, which has been made under the above-mentioned circumstances, is to provide an addition-curable liquid silicone rubber composition capable of forming a low hardness silicone rubber having a hardness of up to 25 on Durometer type A scale and yet a high tear strength and yielding less extractives with n-hexane according to the FDA regulations (21CFR177.2600), and a molded article thereof.

Solution to Problem

Making extensive investigations to attain the above object, the inventor has found that by combining a linear organopolysiloxane containing one silicon-bonded alkenyl group only at each of both molecular chain ends, a linear organopolysiloxane containing two or three silicon-bonded alkenyl groups at each of both molecular chain ends, and an organohydrogenpolysiloxane containing a specific number of silicon-bonded hydrogen atoms with reinforcing silica, there is obtained an addition-curable liquid silicone rubber composition capable of forming a low hardness silicone rubber having a cured hardness of up to 25 on Durometer type A scale and yet a high tear strength (crescent specimen) of at least 15 kN/m and yielding less extractives with n-hexane according to the FDA regulations (21CFR177.2600). The invention is predicated on this finding.

Accordingly, the invention provides an addition-curable liquid silicone rubber composition and a molded silicone rubber article, as defined below.

1. An addition-curable liquid silicone rubber composition comprising:
    (A) 100 parts by weight of an alkenylated linear organopolysiloxane containing one silicon-bonded alkenyl group only at each of both molecular chain ends, having an average degree of polymerization of up to 1,500, and being liquid at 25° C.,
    (B) 1 to 30 parts by weight of an alkenylated linear organopolysiloxane containing two or three silicon-bonded alkenyl groups at each of both molecular chain ends, having an average degree of polymerization of up to 1,500, and being liquid at 25° C.,
    (C) an organohydrogenpolysiloxane consisting of
    (C-1) an organohydrogenpolysiloxane containing at least three silicon-bonded hydrogen atoms per molecule and (C-2) a linear organohydrogenpolysiloxane capped with diorganohydrogensiloxy at both molecular chain ends and containing silicon-bonded hydrogen atoms only at both molecular chain ends, the moles of silicon-bonded hydrogen in component (C-1), designated [Si—H groups (C-1)], to the total moles of silicon-bonded hydrogen atoms in components (C-1) and (C-2), designated [total Si—H groups], is 60 to 95 mol % calculated as [Si—H groups (C-1)]/[total Si—H groups]×100, and a molar ratio of the moles of [total Si—H groups] to the total moles of alkenyl groups in the composition, designated [total alkenyl groups], is from 1.0 to 3.0 calculated as [total Si—H groups]/[total alkenyl groups], (D) reinforcing silica obtained from hydrophobic treatment of fumed silica having a BET specific surface area of at least 130 m²/g, in an amount of 5 to 60 parts by weight per 100 parts by weight of components (A) and (B) combined, and (E) an addition reaction catalyst in an amount to give 0.5 to 1,000 ppm of platinum group metal based on the total weight of components (A) and (B).

2. The addition-curable liquid silicone rubber composition of 1 wherein when a silica surface treating agent used for the hydrophobic treatment of component (D) contains an alkenyl group, a molar ratio of the total moles of Si—H groups in components (C-1) and (C-2), designated [total Si—H groups], to the total moles of alkenyl groups in components (A), (B) and (D), designated [total alkenyl groups], is from 1.0 to 3.0 calculated as [total Si—H groups]/[total alkenyl groups].

3. The addition-curable liquid silicone rubber composition of 1 or 2, further comprising (F) an organopolysiloxane having an average degree of polymerization of at least 2,000 and being gum-like at 25° C. in an amount of 1 to 200 parts by weight per 100 parts by weight of component (A).

4. The addition-curable liquid silicone rubber composition of 3 wherein when the organopolysiloxane as component (F) contains an alkenyl group, a molar ratio of the total moles of Si—H groups in components (C-1) and (C-2), designated [total Si—H groups], to the total moles of all alkenyl groups in the composition containing alkenyl groups, designated [total alkenyl groups], is from 1.0 to 3.0 calculated as [total Si—H groups]/[total alkenyl groups].

5. The addition-curable liquid silicone rubber composition of any one of 1 to 4 wherein component (B) is a linear organopolysiloxane containing three silicon-bonded alkenyl groups at each of both molecular chain ends.

6. The addition-curable liquid silicone rubber composition of any one of 1 to 5 wherein component (C-1) is an organohydrogenpolysiloxane containing 3 to 6 silicon-bonded hydrogen atoms per molecule.

7. A molded silicone rubber article obtained by curing the addition-curable liquid silicone rubber composition of any one of 1 to 6, intended for use in contact with food or beverage, wherein when a molded silicone rubber article having a thickness of 2 mm is subjected to the n-hexane extraction test according to the FDA regulations (21CFR177.2600), the amount of extractives is up to 175 mg/inch² during the first 7 hours of extraction and up to 4 mg/inch² during the succeeding 2 hours of extraction.

Advantageous Effects of Invention

The addition-curable liquid silicone rubber composition of the invention is capable of forming a low hardness silicone rubber having a cured hardness of up to 25 on Durometer type A scale and yet a high tear strength and yielding less extractives with n-hexane according to the FDA regulations (21CFR177.2600). A molded silicone rubber article thereof is also obtainable.

DESCRIPTION OF EMBODIMENTS

Now the invention is described in detail.
<Addition-Curable Liquid Silicone Rubber Composition>
The invention provides an addition-curable liquid silicone rubber composition comprising the following components (A) to (E).
(A) Organopolysiloxane Containing One Alkenyl Group at Each of Both Molecular Chain Ends Component (A) is an organopolysiloxane which serves as a base polymer in the inventive composition, specifically an alkenylated linear organopolysiloxane which contains one silicon-bonded alkenyl group only at each of both molecular chain ends, but not an alkenyl group at any midway position in the molecular chain, has an average degree of polymerization of up to 1,500, and is liquid at 25° C., that is, a difunctional linear organopolysiloxane containing one alkenyl group at each end of the molecular chain per molecule.

Preferably, those having the general formula (I) may be used as component (A).

[Chem. 1]

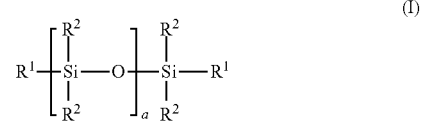

Herein $R^1$ which may be the same or different is a $C_2$-$C_{10}$, preferably $C_2$-$C_8$ alkenyl group, $R^2$ which may be the same or different is a $C_1$-$C_{10}$, preferably $C_1$-$C_8$ substituted or unsubstituted monovalent hydrocarbon group which is free of aliphatic unsaturation such as alkenyl, and "a" is an integer of up to 1,500, typically 100 to 1,500, preferably 300 to 1,200.

Examples of the alkenyl group $R^1$ include vinyl, allyl, propenyl, butenyl, hexenyl and octenyl. $R^1$ is preferably vinyl, allyl or propenyl, with vinyl being most preferred.

Examples of the monovalent hydrocarbon group which is free of aliphatic unsaturation such as alkenyl, represented by $R^2$, include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, and substituted forms of the foregoing in which some or all hydrogen atoms are substituted by halogen atoms (e.g., fluorine, bromine or chlorine), cyano or the like, for example, chloromethyl, chloropropyl, bromoethyl, trifluoropropyl and cyanoethyl. Preferably at least 90 mol % of all groups $R^2$ are methyl, most preferably all groups $R^2$ are methyl.

As shown by formula (I), the organopolysiloxane as component (A) preferably has a linear structure which is capped at both ends of the molecular chain with alkenyldiorganosiloxy groups (e.g., vinyldimethylsiloxy, vinylmethylphenylsiloxy, or allyldimethylsiloxy groups) and whose backbone consists of randomly repeating diorganosiloxane units (e.g., dimethylsiloxane, methylphenylsiloxane, diphenylsiloxane or methyltrifluoropropylsiloxane units).

The organopolysiloxane as component (A) is typically a diorganopolysiloxane capped at both ends of the molecular chain with diorganoalkenylsiloxy groups. It is noted that the "organo group" in the siloxane refers to a substituted or unsubstituted monovalent hydrocarbon group, exclusive of alkenyl, like the group represented by $R^2$ in formula (I).

The organopolysiloxane should have an average degree of polymerization (DOP) of up to 1,500, typically 100 to 1,500, preferably 300 to 1,200. If DOP is less than 100, no sufficient rubbery feel may be obtained. If DOP exceeds 1,500, an increased viscosity can hinder molding.

As used herein, the average degree of polymerization (DOP) refers to a number average DOP, i.e., average DOP as measured by gel permeation chromatography (GPC) versus polystyrene standards under the following conditions.

| [Measurement conditions] | |
|---|---|
| Developing solvent: | toluene |
| Flow rate: | 1 mL/min |
| Detector: | differential refractive index detector (RI) |
| Column: | KF-805L × 2 (Shodex) |
| Column temperature: | 25° C. |
| Sample dose: | 30 μL (toluene solution of 0.2 wt % concentration) |

Component (A) may be an organopolysiloxane alone or a mixture of two or more organopolysiloxanes which differ in molecular structure (for example, the type and proportion of substituent on alkenyldiorganosiloxy group at molecular chain end or on diorganosiloxane units in the backbone) or DOP as long as a linear organopolysiloxane containing silicon-bonded alkenyl groups at both ends of the molecular chain is used.

(B) Organopolysiloxane Containing Two or Three Alkenyl Groups at Each of Both Molecular Chain Ends Component (B) is an organopolysiloxane which is effective for inhibiting formation of non-crosslinked organopolysiloxane as a result of chain extension of components (A) and (C-2). Specifically, it is an alkenylated linear organopolysiloxane containing two or three silicon-bonded alkenyl groups at each of both molecular chain ends, having an average DOP of up to 1,500, and being liquid at 25° C. Component (B) is definitely different from component (A) in that it contains two or three alkenyl groups at each molecular chain end.

Preferably, those having the general formula (II) may be used as component (B).

[Chem. 2]

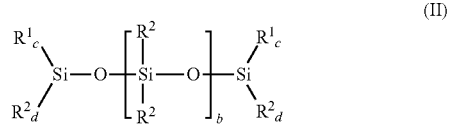

(II)

Herein $R^1$ which may be the same or different is a $C_2$-$C_{10}$, preferably $C_2$-$C_8$ alkenyl group, $R^2$ which may be the same or different is a $C_1$-$C_{10}$, preferably $C_1$-$C_8$ substituted or unsubstituted monovalent hydrocarbon group which is free of aliphatic unsaturation such as alkenyl, b is an integer of up to 1,500, c is an integer of 2 or 3, d is an integer of 0 or 1, and c+d=3.

Examples of the alkenyl group $R^1$ include vinyl, allyl, propenyl, butenyl, hexenyl and octenyl. $R^1$ is preferably vinyl, allyl or propenyl, with vinyl being most preferred.

Examples of the monovalent hydrocarbon group which is free of aliphatic unsaturation such as alkenyl, represented by $R^2$, include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, and substituted forms of the foregoing in which some or all hydrogen atoms are substituted by halogen atoms (e.g., fluorine, bromine or chlorine), cyano or the like, for example, chloromethyl, chloropropyl, bromoethyl, trifluoropropyl and cyanoethyl. Preferably at least 90 mol % of all groups $R^2$ are methyl, most preferably all groups $R^2$ are methyl.

As shown by formula (II), the organopolysiloxane as component (B) preferably has a linear structure which is capped at both ends of the molecular chain with dialkenylorganosiloxy groups (e.g., divinylmethylsiloxy, divinylphenylsiloxy, or diallylmethylsiloxy groups) or trialkenylsiloxy groups (e.g., trivinylsiloxy or triallylsiloxy groups) and whose backbone consists of randomly repeating diorganosiloxane units (e.g., dimethylsiloxane, methylphenylsiloxane, diphenylsiloxane or methyltrifluoropropylsiloxane units).

The organopolysiloxane as component (B) is typically a diorganopolysiloxane capped with dialkenylorganosiloxy groups at both ends of the molecular chain, diorganopolysiloxane capped with trialkenylorganosiloxy groups at both ends of the molecular chain, or diorganopolysiloxane capped with a dialkenylorganosiloxy group at one end of the molecular chain and with a trialkenylsiloxy group at another end. It is noted that the "organo group" in the siloxane refers to a substituted or unsubstituted monovalent hydrocarbon group, exclusive of alkenyl, like the group represented by $R^2$ in formulae (I) and (II).

The organopolysiloxane should have an average DOP of up to 1,500, typically 100 to 1,500, preferably 200 to 1,500, more preferably 300 to 1,200. Use of component (B) having a DOP in the range ensures to obtain a silicone rubber having a low hardness, high tear, and less extractives with n-hexane.

Component (B) may be an organopolysiloxane alone or a mixture of two or more organopolysiloxanes which differ in molecular structure (for example, the type and proportion of substituent on alkenyldiorganosiloxy group at molecular chain end or on diorganosiloxane units in the backbone) or DOP as long as a linear organopolysiloxane containing two or three silicon-bonded alkenyl groups at each of both molecular chain ends is used.

(C) Organohydrogenpolysiloxane

Component (C) is an organohydrogenpolysiloxane having silicon-bonded hydrogen atoms (Si—H groups) and defined as a mixture of two organohydrogenpolysiloxanes: (C-1) an organohydrogenpolysiloxane containing at least three silicon-bonded hydrogen atoms per molecule and (C-2) a linear organohydrogenpolysiloxane capped with diorganohydrogensiloxy groups at both molecular chain ends and containing silicon-bonded hydrogen atoms only at both ends, but no alkenyl groups in the molecule.

Component (C) serves as a curing agent for curing the composition through the mechanism that the Si—H groups in the molecule undergo hydrosilylation addition reaction with the silicon-bonded alkenyl groups in components (A) and (B) and optional components to form crosslinks.

The organohydrogenpolysiloxane as component (C-1) is represented by the average compositional formula (III) below and contains at least 3 silicon-bonded hydrogen atoms (Si—H groups) per molecule.

[Chem. 3]

$$R^2_e H_f SiO_{(4-e-f)/2} \tag{III}$$

Herein $R^2$ which may be the same or different is a $C_1$-$C_{10}$, preferably $C_1$-$C_8$ substituted or unsubstituted monovalent hydrocarbon group which is free of aliphatic unsaturation such as alkenyl, e is a positive number of 0.7 to 2.1, f is a positive number of 0.001 to 1.0, and e+f is 0.8 to 3.0.

Examples of the monovalent hydrocarbon group which is free of aliphatic unsaturation such as alkenyl, represented by $R^2$, include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, and substituted forms of the foregoing in which some or all hydrogen atoms are substituted by halogen atoms (e.g., fluorine, bromine or chlorine), cyano or the like, for example, chloromethyl, chloropropyl, bromoethyl, trifluoropropyl and cyanoethyl. Preferably at least 90 mol % of all groups $R^2$ are methyl, most preferably all groups R 2 are methyl.

The subscript e is a positive number of 0.7 to 2.1, preferably 0.8 to 2.0, f is a positive number of 0.001 to 1.0, preferably 0.01 to 1.0, and e+f is 0.8 to 3.0, preferably 1.0 to 2.5. The molecular structure of the organohydrogenpolysiloxane may be a linear, cyclic, branched or three-dimensional network structure.

In component (C-1), the number of Si—H groups per molecule is at least 3, preferably 3 to 30, more preferably 3 to 10, even more preferably 3 to 6. Also, the content of Si—H groups is 0.0005 to 0.017 mol/g, preferably 0.0008 to 0.010 mol/g, more preferably 0.0008 to 0.005 mol/g of the organohydrogenpolysiloxane.

Preferred is an organohydrogenpolysiloxane in which the number of silicon atoms per molecule or average DOP is about 6 to about 300, especially about 8 to about 150, and which is liquid at 25° C. The silicon-bonded hydrogen atom may be present at the end of the molecular chain and/or at a midway position of the molecular chain.

Examples of the organohydrogenpolysiloxane as component (C-1) include methylhydrogencyclopolysiloxane, methylhydrogensiloxane/dimethylsiloxane cyclic copolymers, both end trimethylsiloxy-capped methylhydrogenpolysiloxane, both end trimethylsiloxy-capped dimethylsiloxane/methylhydrogensiloxane copolymers, both end dimethylhydrogensiloxy-capped dimethylsiloxane/methylhydrogensiloxane copolymers, copolymers consisting of $(CH_3)_2HSiO_{1/2}$ units, $(CH_3)_3SiO_{1/2}$ units, and $SiO_{4/2}$ units, copolymers consisting of $(CH_3)_2HSiO_{1/2}$ units and $SiO_{4/2}$ units, and substituted forms of the foregoing compounds in which some or all methyl groups are substituted by other alkyl groups or the like. Inter alia, both end dimethylhydrogensiloxy-capped dimethylsiloxane/methylhydrogensiloxane copolymers are preferred in view of low hardness and tear strength.

Component (C-1) may be used singly or in admixture.

The organohydrogenpolysiloxane preferred as component (C-2) is a linear organohydrogenpolysiloxane having the general formula (IV) below, which is capped with diorganohydrogensiloxy groups at both molecular chain ends and contains silicon-bonded hydrogen atoms only at both ends, but no alkenyl groups in the molecule.

[Chem. 4]

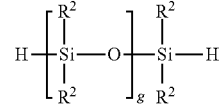

Herein $R^2$ which may be the same or different is a $C_1$-$C_{10}$, preferably $C_1$-$C_8$, substituted or unsubstituted, monovalent hydrocarbon group free of aliphatic unsaturation such as alkenyl, and g is an integer of 1 to 300, preferably 1 to 100, more preferably 2 to 25.

Examples of the monovalent hydrocarbon group which is free of aliphatic unsaturation such as alkenyl, represented by $R^2$, include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, and substituted forms of the foregoing in which some or all hydrogen atoms are substituted by halogen atoms (e.g., fluorine, bromine or chlorine), cyano or the like, for example, chloromethyl, chloropropyl, bromoethyl, trifluoropropyl and cyanoethyl. Preferably at least 90 mol % of all groups $R^2$ are methyl, most preferably all groups $R^2$ are methyl.

In component (C-2), the number of Si—H groups is just 2 in the molecule (i.e., both ends of the molecular chain). Also, the content of Si—H groups is 0.00009 to 0.012 mol/g, preferably 0.0002 to 0.0085 mol/g of the organohydrogenpolysiloxane.

Preferred is an organohydrogenpolysiloxane in which the number of silicon atoms per molecule or average DOP is about 2 to about 300, especially about 3 to about 150, and which is liquid at 25° C.

The organohydrogenpolysiloxane preferred as component (C-2) is a both end dimethylhydrogensiloxy-capped diorganopolysiloxane, especially both end dimethylhydrogensiloxy-capped dimethylpolysiloxane.

Component (C-2) may be used singly or in admixture.

Components (C-1) and (C-2) are combined in such amounts that the moles of silicon-bonded hydrogen in component (C-1), designated [Si—H groups (C-1)], to the total moles of silicon-bonded hydrogen atoms in components (C-1) and (C-2), designated [total Si—H groups], is 60 to 95 mol %, preferably 70 to 90 mol % calculated as [Si—H groups (C-1)]/[total Si—H groups]×100. When components (C-1) and (C-2) are used in this range, the cured rubber has a low hardness, high tear strength and minimal extractives with n-hexane.

The total amount of components (C-1) and (C-2) is such that a molar ratio of the total moles of Si—H groups in components (C-1) and (C-2), designated [total Si—H groups], to the total moles of alkenyl groups in the composition (the total moles of alkenyl groups in components (A), (B), (D) and (F) when not only components (A) and (B) contain alkenyl groups, but component (D) and/or (F) also contains alkenyl groups), designated [total alkenyl groups], is from 1.0 to 3.0, preferably from 1.1 to 2.5, calculated as [total Si—H groups]/[total alkenyl groups]. When this ratio is at least 1.0, the cured rubber has such a crosslinking density that it is not sticky on the surface. When the ratio is up to 3.0, there are no risks of a sharp rise of hardness on heating and foaming during cure.

(D) Reinforcing Silica

Component (D) is reinforcing silica which is essential to provide the resulting silicone rubber with sufficient strength. Component (D) is obtained from hydrophobic treatment of fumed silica. The fumed silica used herein should have a specific surface area of at least 130 m$^2$/g, typically 130 to 400 m$^2$/g, preferably 200 to 380 m$^2$/g as measured by the BET method. On use of reinforcing silica within the range, a silicone rubber having a satisfactory strength is obtainable.

The reinforcing silica as component (D) is preferably one obtained from hydrophobic surface treatment of fumed silica, sometimes simply referred to as "silica," hereinafter, in view of dispersibility in silicone oil and reinforcement.

The reinforcing silica as component (D) may be one obtained from the direct hydrophobic surface treatment of silica in powder state with a surface treating agent. Alternatively, hydrophobic surface treatment can be performed by mixing components (A) and (B) with silica fine powder, adding a silica surface treating agent thereto, and heat mixing them.

With respect to the surface treatment procedure, surface treatment may be performed by well-known techniques. For example, an untreated silica fine powder and a silica surface treating agent are fed to a mechanical kneading device closed under atmospheric pressure or a fluidized bed, and mixing treatment is performed at room temperature or elevated temperature, optionally in the presence of an inert gas. In some cases, a catalyst is used to promote surface treatment. The kneading and subsequent drying yields a reinforcing silica fine powder which has been hydrophobic surface treated.

The silica surface treating agent is used for the hydrophobic surface treatment of fumed silica as the precursor of component (D). Examples of the surface treating agent include silazanes such as hexamethyldisilazane and divinyltetramethyldisilazane; silane base coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane; and organosilicon compounds such as polymethylsiloxane and organohydrogenpolysiloxane. The most preferred treating agents are silane base coupling agents and silazanes.

Typically a silane base coupling agent or silazane having an alkenyl group is used in an amount of 0.00065 to 0.025 mol/g, preferably 0.0013 to 0.012 mol/g because more rubber reinforcement is achieved using a small amount of the silane base coupling agent or silazane having an alkenyl group.

The amount of the silica surface treating agent used is 5 to 75 parts by weight, preferably 5 to 60 parts by weight per 100 parts by weight of fumed silica. When the silane base coupling agent or silazane having an alkenyl group is used in an amount of 0.1 to 1.0 part by weight per 100 parts by weight of fumed silica, there is a likelihood that the cured rubber has a low hardness and high strength.

When the silica surface treating agent used in the hydrophobic treatment of component (D) contains an alkenyl group, a molar ratio of the total moles of Si—H groups in components (C-1) and (C-2), designated [total Si—H groups], to the total moles of alkenyl groups in components (A), (B) and (D), designated [total alkenyl groups], is preferably from 1.0 to 3.0 calculated as [total Si—H groups]/[total alkenyl groups].

The reinforcing silica as component (D) is blended in an amount of 5 to 60 parts by weight, preferably 10 to 50 parts by weight per 100 parts by weight of components (A) and (B) combined. When the amount of component (D) is at least 5 parts by weight, a reinforcing effect is exerted. When the amount of component (D) is up to 60 parts by weight, molding failure due to viscosity anomaly is prevented.

(E) Addition Reaction Catalyst

Component (E) is an addition reaction catalyst, examples of which include platinum base catalysts such as platinum black, platinic chloride, chloroplatinic acid, the reaction products of chloroplatinic acid with monohydric alcohols, complexes of chloroplatinic acid with olefins, and platinum bisacetoacetate, palladium base catalysts, and rhodium base catalysts.

The amount of the addition reaction catalyst used may be a catalytic amount, and is typically 0.5 to 1,000 ppm, especially 1 to 500 ppm of platinum group metal (calculated in weight) based on the total weight of components (A) and (B).

(F) Gum-Like Organopolysiloxane

In the inventive composition, component (F) may be blended. It is used for adjusting the viscosity of the composition (viscosity buildup) or reducing the hardness of the cured product. Component (F) is an organopolysiloxane having an average DOP (number average DOP) of at least 2,000, the organopolysiloxane being gum-like (i.e., non-liquid without self-flowing properties) at 25° C. An organopolysiloxane having the average compositional formula (V) may be used.

[Chem. 5]

$$R^3_h SiO_{(4-h)/2} \qquad (V)$$

Herein R$^3$ which may be the same or different is a substituted or unsubstituted, C$_1$-C$_{10}$, preferably C$_1$-C$_8$, monovalent hydrocarbon group, and h is a positive number in the range of 1.8 to 2.5, preferably 1.9 to 2.1, more preferably 1.98 to 2.01.

Examples of the monovalent hydrocarbon group R$^3$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which one or more or all hydrogen atoms are substituted by halogen atoms (e.g., fluorine, bromine or chlorine), cyano or the like, for example, chloromethyl, chloropropyl, bromoethyl, trifluoropropyl and cyanoethyl. Preferably at least 90 mol % of all groups R$^3$ are methyl, with the balance being vinyl.

R$^3$ may or may not contain an alkenyl group, preferably of 2 to 8 carbon atoms, more preferably 2 to 6 carbon atoms, most preferably vinyl. When contained, the content of alkenyl group is preferably up to 0.0026 mol/g, more preferably up to 0.0014 mol/g in view of hardness lowering. The alkenyl group may bond to the silicon atom at the end of the molecular chain and/or a silicon atom midway the molecular chain.

The organopolysiloxane basically has a linear structure which has a backbone composed of repeating diorganosiloxane units and is capped at either end of the molecular chain with a triorganosiloxy group although it may partially contain a branched or cyclic structure.

The organopolysiloxane has an average DOP of at least 2,000, typically about 2,000 to about 100,000, and is gum-like (i.e., non-liquid without self-flowing properties) at 25° C. The average DOP is preferably at least 3,000, typically about 3,000 to about 80,000. With an average DOP of at least 2,000, the compound is adequate as a viscosity tailoring or thickening agent.

Of the organopolysiloxanes as component (F), the organopolysiloxane free of an alkenyl group in the molecule is exemplified by a molecular chain both end triorganosiloxy-capped diorganopolysiloxane gum. Examples of the organopolysiloxane containing an alkenyl group in the molecule include molecular chain both end diorganoalkenylsiloxy-capped diorganopolysiloxane gum, molecular chain both end organodialkenylsiloxy-capped diorganopolysiloxane gum, molecular chain both end trialkenylsiloxy-capped diorganopolysiloxane gum, molecular chain both end triorganosiloxy-capped diorganosiloxane/organoalkenylsiloxane copolymer gum, molecular chain both end diorganoalkenylsiloxy-capped diorganosiloxane/organoalkenylsiloxane copolymer gum, and diorganosiloxane/organoalkenylsiloxane copolymer gum capped with diorganoalkenylsiloxy at one end and with triorganosiloxy at the other end of the molecular chain. Preferred are molecular chain both end triorganosiloxy-capped diorganopolysiloxane gum, molecular chain both end diorganoalkenylsiloxy-capped diorganopolysiloxane gum, molecular chain both end triorganosiloxy-capped diorganosiloxane/organoalkenylsiloxane copolymer gum, and molecular chain both end diorganoalkenylsiloxy-capped diorganosiloxane/organoalkenylsiloxane copolymer gum. It is noted that the term "organo" group in each siloxane has the same meaning as the substituted or unsubstituted monovalent hydrocarbon group, exclusive of alkenyl, represented by $R^3$ in formula (V).

When the organopolysiloxane as component (F) contains an alkenyl group, a molar ratio of the total moles of Si—H groups in components (C-1) and (C-2), designated [total Si—H groups], to the total moles of alkenyl groups in the composition containing alkenyl groups, designated [total alkenyl groups], is preferably from 1.0 to 3.0 calculated as [total Si—H groups]/[total alkenyl groups].

Component (F) is optional. When used, the amount of component (F) is preferably 1 to 200 parts by weight, more preferably 3 to 150 parts by weight, and even more preferably 5 to 120 parts by weight per 100 parts by weight of component (A). Less than 1 parts by weight of component (F) may fail to exert the addition effect whereas more than 200 parts by weight may cause the composition to have a too high viscosity to mold.

Other Components

Other components may be blended in the addition-curable liquid silicone rubber composition of the invention, if necessary. Included are fillers such as precipitated silica, quartz powder, diatomaceous earth, and calcium carbonate; electroconductive agents such as carbon black, conductive zinc white, and metal powders; hydrosilylation reaction inhibitors such as nitrogen-containing compounds, acetylene compounds, phosphorus compounds, nitrile compounds, carboxylates, tin compounds, mercury compounds, and sulfur compounds; heat resistance improvers such as iron oxide and cerium oxide; internal parting agents such as dimethylsilicone oil; tackifiers (typically organosilicon compounds such as alkoxysilanes containing at least one functional group selected from alkenyl, epoxy, amino, (meth)acryloxy and mercapto groups in the molecule, and free of a Si—H group in the molecule); and thixotropic agents.

<Preparation and Molding of Addition-Curable Liquid Silicone Rubber Composition>

An addition-curable liquid silicone rubber composition may be prepared by mixing the foregoing components (A) to (E), preferably components (A) to (F) and other optional components until uniform.

The method for molding and curing the addition-curable liquid silicone rubber composition may be any of standard methods. As the molding method, liquid injection molding is preferably employed. The curing conditions may be heat treating conditions including at 100 to 230° C. for 3 seconds to 30 minutes, preferably at 110 to 210° C. for 5 seconds to 20 minutes, more preferably at 120 to 200° C. for 5 seconds to 10 minutes. If necessary, this may be followed by post-cure (or secondary vulcanization) at 80 to 230° C., especially 100 to 210° C. for 10 minutes to 24 hours, especially 30 minutes to 10 hours.

<Molded Silicone Rubber Article>

When the addition-curable liquid silicone rubber composition of the invention is press cured at 120° C. for 10 minutes and post cured at 150° C. for 1 hour into a molded silicone rubber article (or elastomer), the molded article is a low hardness silicone rubber having a hardness of about 10 to about 25 on Durometer type A scale as measured according to JIS K 6253-3:2012, and is preferably at the same time a silicone rubber having high strength despite low hardness, as demonstrated by a tear strength (crescent test piece) of at least 15 kN/m, more preferably at least 18 kN/m as measured according to JIS K 6252:2007.

The molded silicone rubber article is intended for repeated use in contact with food or beverage and meets that when a molded article having a thickness of 2 mm is subjected to the n-hexane extraction test according to the FDA regulations (21CFR177.2600), the amount of extractives is up to 175 mg/inch$^2$ during the first 7 hours of extraction and up to 4 mg/inch$^2$ during the succeeding 2 hours of extraction.

The addition-curable liquid silicone rubber composition is effectively curable and forms a silicone rubber having a low hardness and a high tear strength after curing and leaving less ingredients leached out in edible oils such as high fat foods. In particular, the rubber articles intended for repeated use are useful as bottle nipples, food containers, beverage containers and the like.

EXAMPLES

Examples and Comparative Examples are given below by way of illustration of the invention and not by way of limitation. All parts are by weight. The average degree of polymerization (DOP) is a number average DOP.

Example 1

Both end dimethylvinylsiloxy-capped dimethylpolysiloxane (A-1) having an average DOP of 750, 65 parts, was mixed with 40 parts of fumed silica having a BET specific surface area of 300 m$^2$/g (Aerosil 300 by Nippon Aerosil Co.), 8 parts of hexamethyldisilazane, 0.1 part of 1,3-divinyl-1,1,3,3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base.

To 105 parts of the silicone rubber base, 33 parts of the dimethylpolysiloxane (A-1), 20 parts of both end trivinylsiloxy-capped dimethylpolysiloxane (B-1) having an average DOP of 1,100, and 30 parts of both end trimethylvinylsiloxy-capped dimethylpolysiloxane gum (F-1) having an average DOP of 8,000 were added, followed by stirring for 30 minutes. Further, 3.62 parts of methylhydrogen-dimethylpolysiloxane (C-1-1) capped at both ends with dimethylhydrogensiloxy and containing, on the average, 2 Si—H groups on pendant (average DOP Si—H content 0.0014 mol/g), 1.21 parts of dimethylpolysiloxane (C-2-1) capped at both ends with dimethylhydrogensiloxy and free of Si—H group on pendant (average DOP 20, Si—H content mol/g) as a crosslinker, and 0.075 part of ethynylcyclohexanol as a reaction inhibitor were added to the mixture, which was continuously stirred for 15 minutes, obtaining a silicone rubber mixture.

It is noted that the blend ratio of Si—H groups in components (C-1-1) and (C-2-1) relative to the total amount of Si—H groups in the overall mixture is such that the ratio of component (C-1-1) is 75 mol % and the ratio of component (C-2-1) is 25 mol %, and the molar ratio of the total amount of Si—H groups in the composition to the total amount of vinyl groups in components (A), (B), (D) and (F) is 1.3 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Example 2

Both end dimethylvinylsiloxy-capped dimethylpolysiloxane (A-1) having an average DOP of 750, 65 parts, was mixed with 40 parts of fumed silica having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base.

To 105 parts of the silicone rubber base, 43 parts of the dimethylpolysiloxane (A-1), 10 parts of both end trivinylsiloxy-capped dimethylpolysiloxane (B-1) having an average DOP of 1,100, and 30 parts of both end dimethylvinylsiloxy-capped dimethylpolysiloxane gum (F-1) having an average DOP of 8,000 were added, followed by stirring for 30 minutes. Further, 3.89 parts of methylhydrogen-dimethylpolysiloxane (C-1-1) capped at both ends with dimethylhydrogensiloxy and containing, on the average, 2 Si—H groups on pendant (average DOP Si—H content 0.0014 mol/g), 1.30 parts of dimethylpolysiloxane (C-2-1) capped at both ends with dimethylhydrogensiloxy and free of Si—H group on pendant (average DOP 20, Si—H content mol/g) as a crosslinker, and 0.075 part of ethynylcyclohexanol as a reaction inhibitor were added to the mixture, which was continuously stirred for 15 minutes, obtaining a silicone rubber mixture.

It is noted that the blend ratio of Si—H groups in components (C-1-1) and (C-2-1) relative to the total amount of Si—H groups in the overall mixture is such that the ratio of component (C-1-1) is 75 mol % and the ratio of component (C-2-1) is 25 mol %, and the molar ratio of the total amount of Si—H groups to the total amount of vinyl groups in components (A), (B), (D) and (F) is 1.5 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Example 3

Both end dimethylvinylsiloxy-capped dimethylpolysiloxane (A-1) having an average DOP of 750, 65 parts, was mixed with 40 parts of fumed silica having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base.

To 105 parts of the silicone rubber base, 43 parts of the dimethylpolysiloxane (A-1), 10 parts of both end trivinylsiloxy-capped dimethylpolysiloxane (B-2) having an average DOP of 400, and 30 parts of both end dimethylvinylsiloxy-capped dimethylpolysiloxane gum (F-1) having an average DOP of 8,000 were added, followed by stirring for 30 minutes. Further, 3.97 parts of methylhydrogen-dimethylpolysiloxane (C-1-1) capped at both ends with dimethylhydrogensiloxy and containing, on the average, 2 Si—H groups on pendant (average DOP Si—H content 0.0014 mol/g), 1.70 parts of dimethylpolysiloxane (C-2-1) capped at both ends with dimethylhydrogensiloxy and free of Si—H group on pendant (average DOP 20, Si—H content mol/g) as a crosslinker, and 0.075 part of ethynylcyclohexanol as a reaction inhibitor were added to the mixture, which was continuously stirred for 15 minutes, obtaining a silicone rubber mixture.

It is noted that the blend ratio of Si—H groups in components (C-1-1) and (C-2-1) relative to the total amount of Si—H groups in the overall mixture is such that the ratio of component (C-1-1) is 70 mol % and the ratio of component (C-2-1) is 30 mol %, and the molar ratio of the total amount of Si—H groups in the composition to the total amount of vinyl groups in components (A), (B), (D) and (F) is 1.3 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:

2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Example 4

Both end dimethylvinylsiloxy-capped dimethylpolysiloxane (A-1) having an average DOP of 750, 65 parts, was mixed with 40 parts of fumed silica having a BET specific surface area of 300 m$^2$/g (Aerosil 300 by Nippon Aerosil Co.), 8 parts of hexamethyldisilazane, 0.1 part of 1,3-divinyl-1,1,3,3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A-1), 40 parts of a both end dimethylvinylsiloxy-capped dimethylpolysiloxane (A-2) having an average DOP of 1,100 and 10 parts of both end trivinylsiloxy-capped dimethylpolysiloxane (B-1) having an average DOP of 1,100 were added, followed by stirring for 30 minutes. Further, 3.80 parts of methylhydrogen-dimethylpolysiloxane (C-1-1) capped at both ends with dimethylhydrogensiloxy and containing, on the average, 2 Si—H groups on pendant (average DOP Si—H content 0.0014 mol/g), 1.25 parts of dimethylpolysiloxane (C-2-1) capped at both ends with dimethylhydrogensiloxy and free of Si—H group on pendant (average DOP 20, Si—H content mol/g) as a crosslinker, and 0.075 part of ethynylcyclohexanol as a reaction inhibitor were added to the mixture, which was continuously stirred for 15 minutes, obtaining a silicone rubber mixture.

It is noted that the blend ratio of Si—H groups in components (C-1-1) and (C-2-1) relative to the total amount of Si—H groups in the overall mixture is such that the ratio of component (C-1-1) is 75 mol % and the ratio of component (C-2-1) is 25 mol %, and the molar ratio of the total amount of Si—H groups in the composition to the total amount of vinyl groups in components (A), (B), and (D) is 1.3 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Comparative Example 1

Both end dimethylvinylsiloxy-capped dimethylpolysiloxane (A-1) having an average DOP of 750, 65 parts, was mixed with 40 parts of fumed silica having a BET specific surface area of 300 m$^2$/g (Aerosil 300 by Nippon Aerosil Co.), 8 parts of hexamethyldisilazane, 0.1 part of 1,3-divinyl-1,1,3,3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base.

To 105 parts of the silicone rubber base, 53 parts of the dimethylpolysiloxane (A-1) and parts of both end dimethylvinylsiloxy-capped dimethylpolysiloxane gum (F-1) having an average DOP of 8,000 were added, followed by stirring for 30 minutes. Further, 2.96 parts of methylhydrogen-dimethylpolysiloxane (C-1-1) capped at both ends with dimethylhydrogensiloxy and containing, on the average, 2 Si—H groups on pendant (average DOP Si—H content 0.0014 mol/g), 0.99 part of dimethylpolysiloxane (C-2-1) capped at both ends with dimethylhydrogensiloxy and free of Si—H group on pendant (average DOP 20, Si—H content mol/g) as a crosslinker, and 0.075 part of ethynylcyclohexanol as a reaction inhibitor were added to the mixture, which was continuously stirred for 15 minutes, obtaining a silicone rubber mixture.

It is noted that the blend ratio of Si—H groups in components (C-1-1) and (C-2-1) relative to the total amount of Si—H groups in the overall mixture is such that the ratio of component (C-1-1) is 75 mol % and the ratio of component (C-2-1) is 25 mol %, and the molar ratio of the total amount of Si—H groups in the composition to the total amount of vinyl groups in components (A), (D) and (F) is 1.3 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Comparative Example 2

Both end dimethylvinylsiloxy-capped dimethylpolysiloxane (A-1) having an average DOP of 750, 65 parts, was mixed with 40 parts of fumed silica having a BET specific surface area of 300 m$^2$/g (Aerosil 300 by Nippon Aerosil Co.), 8 parts of hexamethyldisilazane, 0.1 part of 1,3-divinyl-1,1,3,3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A-1), 30 parts of both end dimethylvinylsiloxy-capped dimethylpolysiloxane gum (F-1) having an average DOP of 8,000, and 30 parts of both end trimethylsiloxy-capped, alkenyl-free, dimethylpolysiloxane having an average DOP of 60 were added, followed by stirring for 30 minutes. Further, 0.88 part of methylhydrogen-dimethylpolysiloxane (C-1-2) capped at both ends with trimethylsiloxy and containing, on the average, 12 Si—H groups on pendant (average DOP 25, Si—H content 0.0070 mol/g) as a crosslinker, and 0.05 part of ethynylcyclohexanol as a reaction inhibitor were added to the mixture, which was continuously stirred for 15 minutes, obtaining a silicone rubber mixture.

In the mixture, the molar ratio of the total amount of Si—H groups in the composition to the amount of vinyl groups in components (A), (D) and (F) is 1.8 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252: 2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Comparative Example 3

Both end dimethylvinylsiloxy-capped dimethylpolysiloxane (A-1) having an average DOP of 750, 65 parts, was mixed with 40 parts of fumed silica having a BET specific surface area of 300 $m^2/g$ (Aerosil 300 by Nippon Aerosil Co.), 8 parts of hexamethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 50 parts of the dimethylpolysiloxane (A-1), 16 parts of both end dimethylvinylsiloxy-capped dimethylpolysiloxane gum (F-1) having an average DOP of 8,000, and 16 parts of both end trimethylsiloxy-capped dimethylpolysiloxane gum (F-2) having an average DOP of 8,000 were added, followed by stirring for 30 minutes. Further, 1.22 parts of methylhydrogendimethylpolysiloxane (C-1-2) capped at both ends with trimethylsiloxy and containing, on the average, 12 Si—H groups on pendant (average DOP 25, Si—H content 0.0070 mol/g) as a crosslinker, and 0.05 part of ethynylcyclohexanol as a reaction inhibitor were added to the mixture, which was continuously stirred for 15 minutes, obtaining a silicone rubber mixture.

In the mixture, the molar ratio of the total amount of Si—H groups in the composition to the amount of vinyl groups in components (A) and (F) is 1.6 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252: 2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Comparative Example 4

Both end dimethylvinylsiloxy-capped dimethylpolysiloxane (A-1) having an average DOP of 750, 65 parts, was mixed with 40 parts of fumed silica having a BET specific surface area of 300 $m^2/g$ (Aerosil 300 by Nippon Aerosil Co.), 8 parts of hexamethyldisilazane, 0.1 part of 1,3-divinyl-1,1,3,3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base.

To 105 parts of the silicone rubber base, 33 parts of the dimethylpolysiloxane (A-1), 20 parts of both end trivinylsiloxy-capped dimethylpolysiloxane (B-1) having an average DOP of 1,100, and 30 parts of both end dimethylvinylsiloxy-capped dimethylpolysiloxane gum (F-1) having an average DOP of 8,000 were added, followed by stirring for 30 minutes. Further, 2.60 parts of methylhydrogen-dimethylpolysiloxane (C-1-1) capped at both ends with dimethylhydrogensiloxy and containing, on the average, 2 Si—H groups on pendant (average DOP Si—H content 0.0014 mol/g) and 2.60 parts of dimethylpolysiloxane (C-2-1) capped at both ends with dimethylhydrogensiloxy and free of Si—H group on pendant (average DOP 20, Si—H content 0.0014 mol/g) as a crosslinker, and 0.075 part of ethynylcyclohexanol as a reaction inhibitor were added to the mixture, which was continuously stirred for 15 minutes, obtaining a silicone rubber mixture.

It is noted that the blend ratio of Si—H groups in components (C-1-1) and (C-2-1) relative to the total amount of Si—H groups in the overall mixture is such that the ratio of component (C-1-1) is 50 mol % and the ratio of component (C-2-1) is 50 mol %, and the molar ratio of the total amount of Si—H groups in the composition to the total amount of vinyl groups in components (A), (B), (D), and (F) is 1.3 calculated as (Si—H groups/vinyl groups).

The silicone rubber mixture was further mixed with 0.05 part of a platinum catalyst (Pt concentration 1 wt %) as component (E) to form a silicone rubber composition. The composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252: 2007, and the state of rubber surface was judged by finger touch, with the test results shown in Table 1. A test piece of 2 mm thick cured under the above conditions was subjected to the extraction test with n-hexane according to the FDA regulations (21CFR177.2600), with the results shown in Table 2.

Comparative Example 5

Both end dimethylvinylsiloxy-capped dimethylpolysiloxane having an average DOP of 1,800, 65 parts, was mixed with 40 parts of fumed silica having a BET specific surface area of 300 $m^2/g$ (Aerosil 300 by Nippon Aerosil Co.), 8 parts of hexamethyldisilazane, 0.1 part of 1,3-divinyl-1,1,3, 3-tetramethyldisilazane (vinyl content 0.0116 mol/g), and 2.0 parts of water at 25° C. for 30 minutes. The mixture was heated at 150° C., continuously stirred for 3 hours, and cooled, obtaining a silicone rubber base. This silicone rubber base had a very high viscosity and was difficult to handle, with any further study interrupted.

TABLE 1

| | Example | | | | Comparative Example | | | |
|---|---|---|---|---|---|---|---|---|
| | 1 | 2 | 3 | 4 | 1 | 2 | 3 | 4 |
| Hardness, Durometer type A | 22 | 21 | 23 | 25 | 21 | 23 | 20 | 17 |

TABLE 1-continued

|  | Example | | | | Comparative Example | | | |
| --- | --- | --- | --- | --- | --- | --- | --- | --- |
|  | 1 | 2 | 3 | 4 | 1 | 2 | 3 | 4 |
| Tear strength, kN/m | 20 | 24 | 20 | 17 | 20 | 22 | 12 | 24 |
| Surface feel (finger touch) | tack-free | tack-free | tack-free | tack-free | tack-free | tack-free | tack-free | tacky |

TABLE 2

| Hexane extraction test | Example | | | | Comparative Example | | | |
| --- | --- | --- | --- | --- | --- | --- | --- | --- |
|  | 1 | 2 | 3 | 4 | 1 | 2 | 3 | 4 |
| Extractives during first 7 hr, mg/inch$^2$ | 16.5 | 16.9 | 16.9 | 17.2 | 25.5 | 110 | 13.5 | 18.0 |
| Extractives during succeeding 2 hr, mg/inch$^2$ | 1.8 | 3.6 | 2.9 | 3.2 | 13.0 | 45 | 1.9 | 6.5 |

The invention claimed is:

1. An addition-curable liquid silicone rubber composition comprising:
   - (A) 100 parts by weight of an alkenylated linear organopolysiloxane containing one silicon-bonded alkenyl group only at each of both molecular chain ends, having an average degree of polymerization of up to 1,500, and being liquid at 25° C.,
   - (B) 1 to 30 parts by weight of an alkenylated linear organopolysiloxane containing two or three silicon-bonded alkenyl groups at each of both molecular chain ends, having an average degree of polymerization of up to 1,500, and being liquid at 25° C.,
   - (C) an organohydrogenpolysiloxane consisting of
   - (C-1) an organohydrogenpolysiloxane containing at least three silicon-bonded hydrogen atoms per molecule and
   - (C-2) a linear organohydrogenpolysiloxane capped with diorganohydrogensiloxy at both molecular chain ends and containing silicon-bonded hydrogen atoms only at both molecular chain ends,
   the moles of silicon-bonded hydrogen in component (C-1), designated [Si—H groups (C-1)], to the total moles of silicon-bonded hydrogen atoms in components (C-1) and (C-2), designated [total Si—H groups], is 60 to 95 mol % calculated as [Si—H groups (C-1)]/[total Si—H groups]×100, and a molar ratio of the moles of [total Si—H groups] to the total moles of alkenyl groups in the composition, designated [total alkenyl groups], is from 1.0 to 3.0 calculated as [total Si—H groups]/[total alkenyl groups],
   - (D) reinforcing silica obtained from hydrophobic treatment of fumed silica having a BET specific surface area of at least 130 m$^2$/g, in an amount of 5 to 60 parts by weight per 100 parts by weight of components (A) and (B) combined, and
   - (E) an addition reaction catalyst in an amount to give 0.5 to 1,000 ppm of platinum group metal based on the total weight of components (A) and (B).

2. The addition-curable liquid silicone rubber composition of claim 1 wherein when a silica surface treating agent used for the hydrophobic treatment of component (D) contains an alkenyl group, a molar ratio of the total moles of Si—H groups in components (C-1) and (C-2), designated [total Si—H groups], to the total moles of alkenyl groups in components (A), (B) and (D), designated [total alkenyl groups], is from 1.0 to 3.0 calculated as [total Si—H groups]/[total alkenyl groups].

3. The addition-curable liquid silicone rubber composition of claim 1, further comprising (F) an organopolysiloxane having an average degree of polymerization of at least 2,000 and being non-liquid and without self-flowing properties at 25° C. in an amount of 1 to 200 parts by weight per 100 parts by weight of component (A).

4. The addition-curable liquid silicone rubber composition of claim 3 wherein when the organopolysiloxane as component (F) contains an alkenyl group, a molar ratio of the total moles of Si—H groups in components (C-1) and (C-2), designated [total Si—H groups], to the total moles of all alkenyl groups in the composition containing alkenyl groups, designated [total alkenyl groups], is from 1.0 to 3.0 calculated as [total Si—H groups]/[total alkenyl groups].

5. The addition-curable liquid silicone rubber composition of claim 1 wherein component (B) is a linear organopolysiloxane containing three silicon-bonded alkenyl groups at each of both molecular chain ends.

6. The addition-curable liquid silicone rubber composition of claim 1 wherein component (C-1) is an organohydrogenpolysiloxane containing 3 to 6 silicon-bonded hydrogen atoms per molecule.

7. A molded silicone rubber article obtained by curing the addition-curable liquid silicone rubber composition of claim 1, intended for use in contact with food or beverage, wherein when a molded silicone rubber article having a thickness of 2 mm is subjected to the n-hexane extraction test according to the FDA regulations (21CFR177.2600), the amount of extractives is up to 175 mg/inch$^2$ during the first 7 hours of extraction and up to 4 mg/inch$^2$ during the succeeding 2 hours of extraction.

* * * * *